United States Patent
Kuwata et al.

[11] Patent Number: 5,813,878
[45] Date of Patent: *Sep. 29, 1998

[54] SURFACE CONTACT CARD CONNECTOR

[75] Inventors: Tomonari Kuwata; Mitsuo Ishida, both of Tokyo, Japan

[73] Assignee: Hirose Electric Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 770,149

[22] Filed: Dec. 19, 1996

[30] Foreign Application Priority Data

Dec. 28, 1995 [JP] Japan .................................. 7-352213

[51] Int. Cl.$^6$ .................................................. H01R 13/04
[52] U.S. Cl. ........................................ 439/326; 439/331
[58] Field of Search ................................... 439/326–329, 439/330, 331, 629–632, 636, 64, 541.5, 357

[56] References Cited

U.S. PATENT DOCUMENTS

| | | | |
|---|---|---|---|
| 3,216,580 | 11/1965 | Fricker, Jr. | 439/328 |
| 4,743,746 | 5/1988 | Murschall et al. | 439/326 |
| 4,820,186 | 4/1989 | Fujii | 439/326 |
| 5,603,629 | 2/1997 | DeFrasne et al. | 439/326 |

*Primary Examiner*—Hien Vu
*Attorney, Agent, or Firm*—Kanesaka & Takeuchi

[57] ABSTRACT

A surface contact card connector which includes a base section 2 made of an insulating material; a cover section 3 made of an insulating material and attached to the base section at a rear end for rotation between open and close positions; first and second engaging side walls 7 and 15 provided on opposite sides of the base and cover sections, respectively, such that when the cover section is closed, they are opposed to each other; first or second engaging side walls are flexible laterally; engaging windows or depressions 9, 10 being provided in the first or second engaging side walls; engaging and releasing projections 16 and 17 provided on the second or first engaging side walls such that when the cover section is closed, they flex the first or second side walls laterally and engage the engaging members; the engaging projections having a rectangular triangle shape whose upper side 16A is substantially at right angles to the engaging side walls while the release projections being provided at positions flexible with respect to the engaging projections when the cover section is opened.

4 Claims, 5 Drawing Sheets

SURFACE CONTACT CARD CONNECTOR

BACKGROUND OF THE INVENTION

1. Field of the Invention

The present invention relates to connectors for cards with surface contacts.

2. Description of the Related Art

Recently, surface contact cards having a special circuit are used into electronic equipment to enhance or specialize the function of the equipment.

For example, a subscriber identity module (SIM) card is placed in a portable phone to make the phone function dedicated to the SIM card owner. By changing SIM cards, a single phone can be used for many SIM card owners as a personal phone.

As shown in FIG. 6, a SIM card socket connector 50 is provided under the cover of a portable phone for easy exchange of SIM cards. The socket connector 50 includes a base section 51 made of an insulating material and a cover section 52 pivoted to the base section 51. The cover section 52 is turned upward to the open position, and a SIM card S is inserted into receiving grooves 53 which are provided on opposite sides of the cover section 52. Then, the cover section 52 is turned downwardly to the closed position so that the circuit portions of the SIM card S are brought into contact with contact elements which are provided on the base section 51. Then, the phone cover is attached again so that the portable phone functions as dedicated to the SIM card owner.

The socket connector 50 is provided with a lock mechanism to prevent accidental opening of the cover section 52. A slider 54 is provided on the cover section 52 for sliding movement in a direction of A and has engaging pieces 54A which extend outwardly. Recesses 56 are provided on side walls 55 of the base section 51, and engaging grooves 57 extend along the side walls from the recesses 56. When the cover section 52 is closed, the slider 54 is moved towards the front end of the cover section 52 such that the engaging pieces 54A fit in the recesses 56. Then, the slider 54 is moved backwardly such that the engaging pieces 54A fit in the engaging grooves 57. Thus, the engaging pieces 54A engage the engaging grooves 57 to lock the cover section 52 until the slider 54A is moved again toward the front end of the cover section 52.

However, the above conventional connector requires moving the slider for every lock and unlock release operation. If the forward movement of the slider is too small to release the lock, it is necessary to move the slider again. In addition, the engaging grooves increase the thickness of the side walls of the base section and, thus, the width of the socket connector.

SUMMARY OF THE INVENTION

Accordingly, it is an object of the invention to provide a surface contact card connector with a compact lock mechanism which is enable to lock and unlock easily without increasing the width of the contact.

According to the invention there is provided a surface contact card connector which includes a base section made of an insulating material; a cover section made of an insulating material and attached to the base section at a rear end for rotation between open and close positions; a contact element provided on the base section such that a contact portion is brought into contact with a surface contact card when the cover section is closed to the base section; first and second engaging side walls provided on opposite sides of the base and cover sections, respectively, such that when the cover section is closed, they are opposed to each other; the first or second engaging side walls being flexible laterally; engaging members provided in the first or second engaging side walls; engaging and releasing projections provided on the second or first engaging side walls such that when the cover section is closed, they flex the first or second side walls laterally and engage the engaging members; the engaging projections having a rectangular triangle shape whose upper side is substantially at right angles to the engaging side walls while the release projections being provided at positions flexible with respect to the engaging projections when the cover section is opened.

Like conventional connectors, a surface contact card is inserted into the grooves of a cover section of the connector according to the invention.

When the cover section is closed, the second engaging side walls bend the second engaging side walls outwardly, and the engaging projections snap into the engaging members. Consequently, the second engaging side walls return to the original points, and the engaging projections engage the engaging members to lock the cover section to the base section.

To remove the card, the cover section is lifted so that the release projections push the first engaging side walls outwardly. Consequently, the first engaging side walls flex outwardly to release the engaging projections to thereby unlock the cover section from the base section. Thus, the cover section is returned to the open position.

DESCRIPTION OF THE PREFERRED EMBODIMENT

Embodiments of the invention will be described below with reference to FIGS. 1–5.

Figure 1:
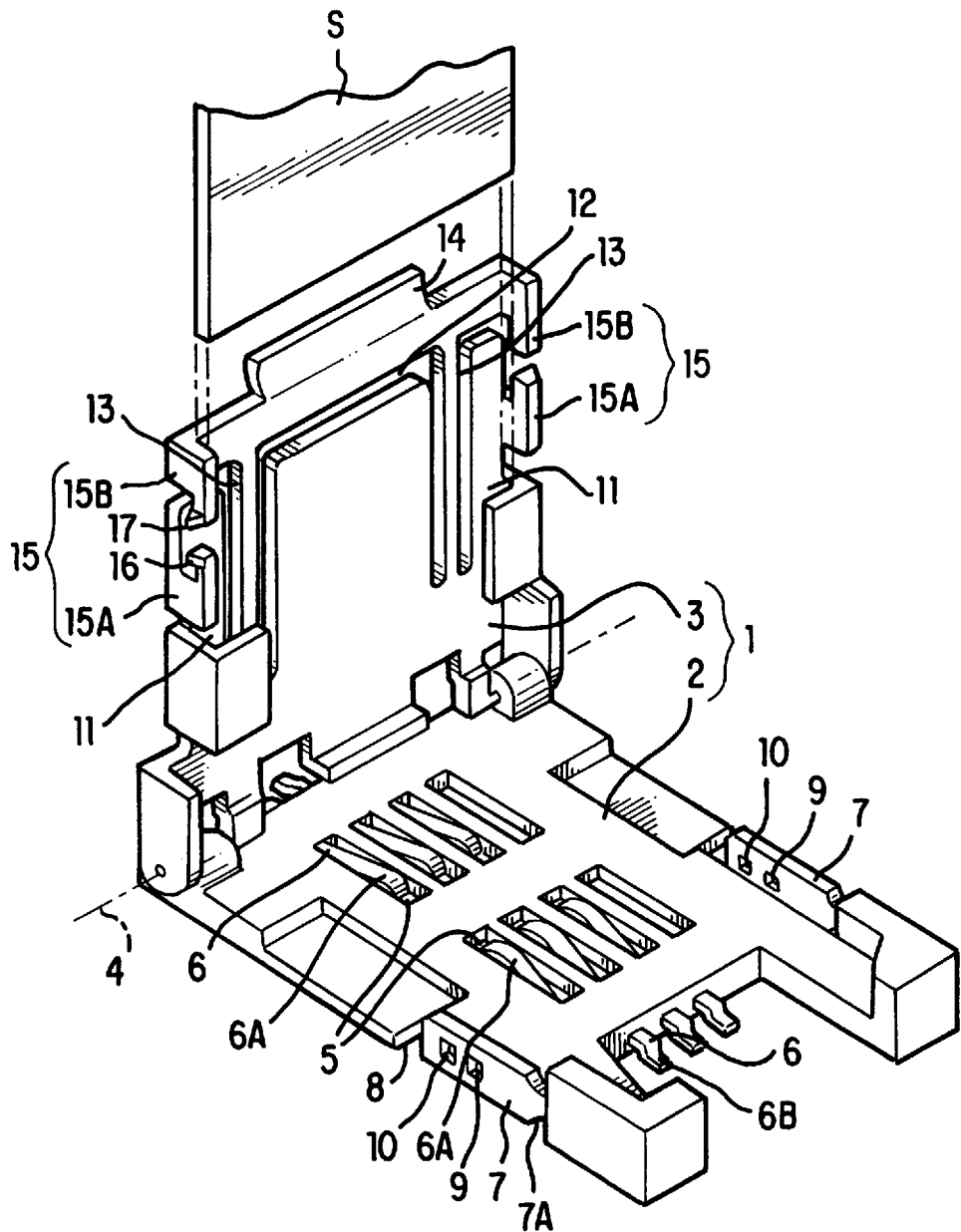
FIG. 1 is a perspective view of a connector with a cover section opened according to an embodiment of the invention.

In FIG. 1, a surface contact card connector 1 includes a base section 2 and a cover section 3 which are made of an insulating material. The base section 2 and the cover section 3 are connected at a rear end for rotation about an axis 4.

A plurality of slots 5 are provided in the central portion of the base section 2 such that the contact portions 6A of contact elements 6 supported by the base section 2 are exposed through the slots 5. The connection portions 6B of the contact elements 6 are bent downwardly such that when the base section 2 is placed on a circuit board, they are brought into contact with the corresponding conductors of the circuit board for connection by soldering, etc.

First engaging side walls 7 extend rearwardly from the front portion of the base section 2 to make them cantilevered with narrowed bases 7A so that when they receive lateral forces, they are flexed laterally (their thicknesswise direction). These first engaging side walls 7 are provided within side recesses 8 of the base section 2 so that they do not extend the width of the base section 2. Two engaging windows 9 and 10 are provided in each of the first engaging side walls 7. Alternatively, these engaging windows 9 and 10 may be C-shaped depressions or one continuous opening or anything whose upper edge functions as an engaging shoulder.

Receiving grooves 11 with a U-shaped cross-section are provided on opposite sides of the cover section 3 so as to receive a surface contact card or SIM card S such that the circuit surface of the SIM card S faces the base section 2.

The cover section 3 is provided with a U-shaped groove 12 and L-shaped grooves 13 on opposite sides of the U-shaped groove 12 such that the end portion is flexible in the thicknesswise direction. A curved tab portion 14 is provided on the front end of the cover section 3 to facilitate opening the cover section 3. Second engaging side walls 15 extend downwardly from the cover section 3 such that when the cover section 3 is closed, they are opposed to insides of the first engaging side walls 7. These second engaging side walls 15 are divided by the grooves 13 into two portions; that is, engaging arms 15A and releasing arms 15B. The releasing arms 15B are more flexible in the thicknesswise direction than the engaging arms 15A. When the cover section 3 is lifted upwardly to the open position with the tab portion 14, the releasing arms 15B are flexed regardless of the engaging arms 15A.

Figure 2:
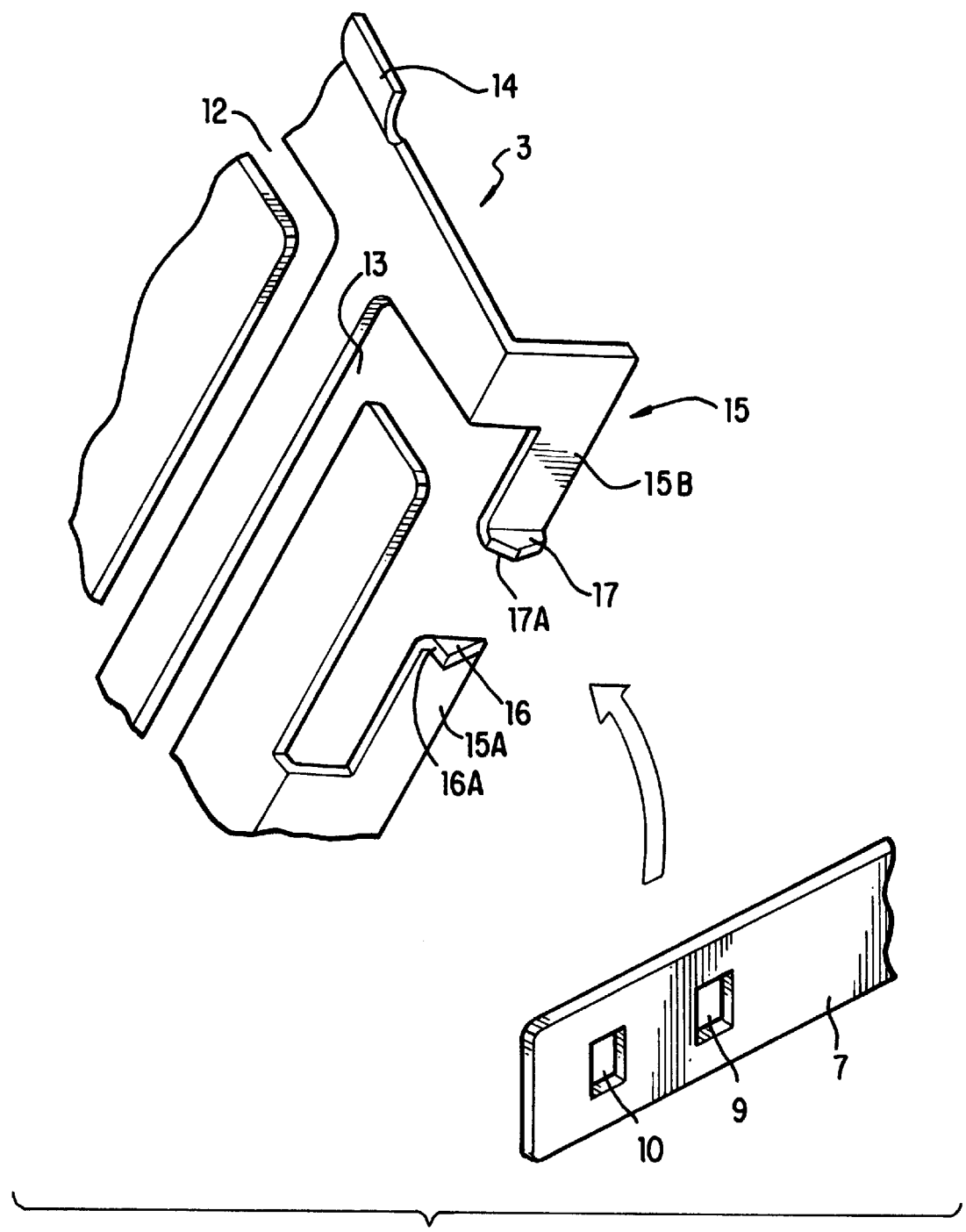
FIG. 2 is an enlarged perspective view of the first and second engaging side walls of the connector.

The tips of the engaging and releasing arms 15A and 15B are bent to form substantially triangular engaging and releasing projections 16 and 17, respectively. As shown in FIG. 2, the engaging projection 16 of the engaging arm 15A has a rectangular triangle shape in which the upper side 16A farther from the first engaging side walls 7 than the other lower side makes right angles to the engaging arm 15A. In contrast, the releasing projection 17 has a triangular shape in which the upper side 17A farther from the first engaging side wall 7 than the lower side is slanted toward the first engaging side wall 7.

The connector is used as follows:

(1) As shown in FIG. 1, a SIM card S is inserted into the receiving grooves 11 of the cover section 3 which is opened.

Figure 3:
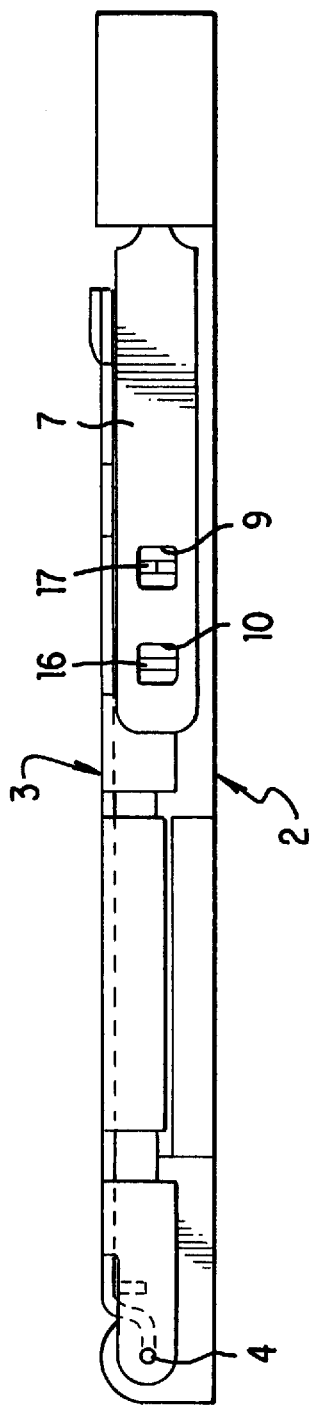
FIG. 3 is a side view of the connector with the cover section closed.
Figure 4:
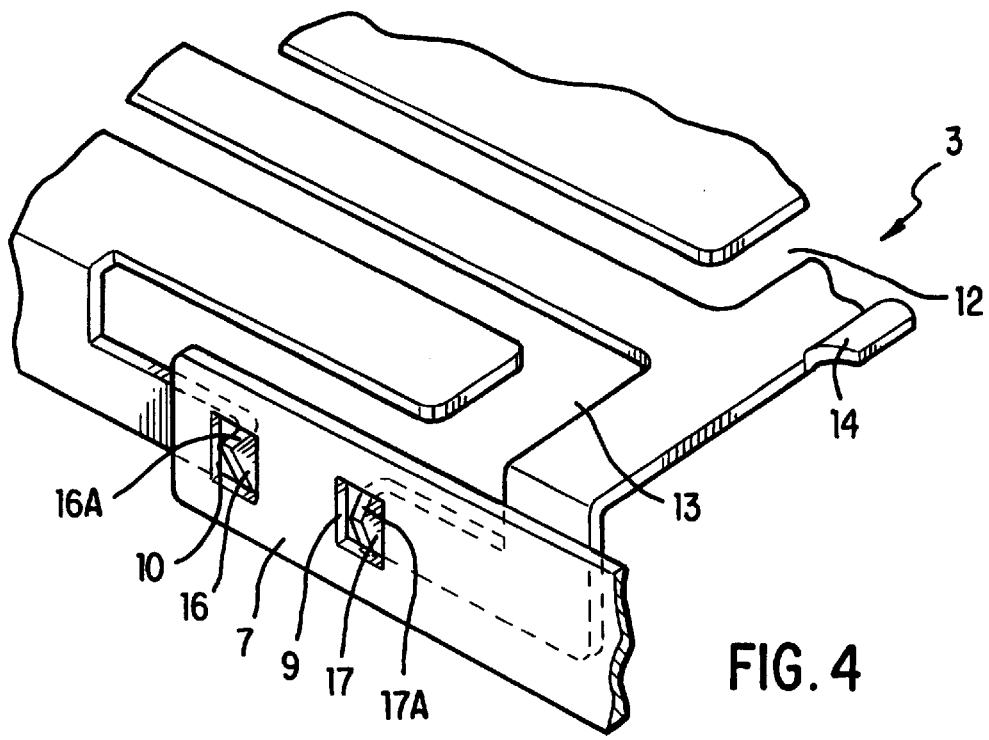
FIG. 4 is a perspective view of the connector with the first and second engaging side walls are locked.

(2) The cover section 3 is turned downwardly to the close position as shown in FIGS. 3 and 4. The engaging and release projections 16 and 17 abut the first engaging side walls 7 on the lower sides closer to the base section 2 than the upper sides 16A and 17A, respectively, and push them outwardly and then snap into the engaging windows 10 and 9, respectively. The upper sides 16A of the engaging projections 16 engage the upper edges of the engaging windows 10 to thereby lock the cover section 3 to the base section 2.

Figure 5:
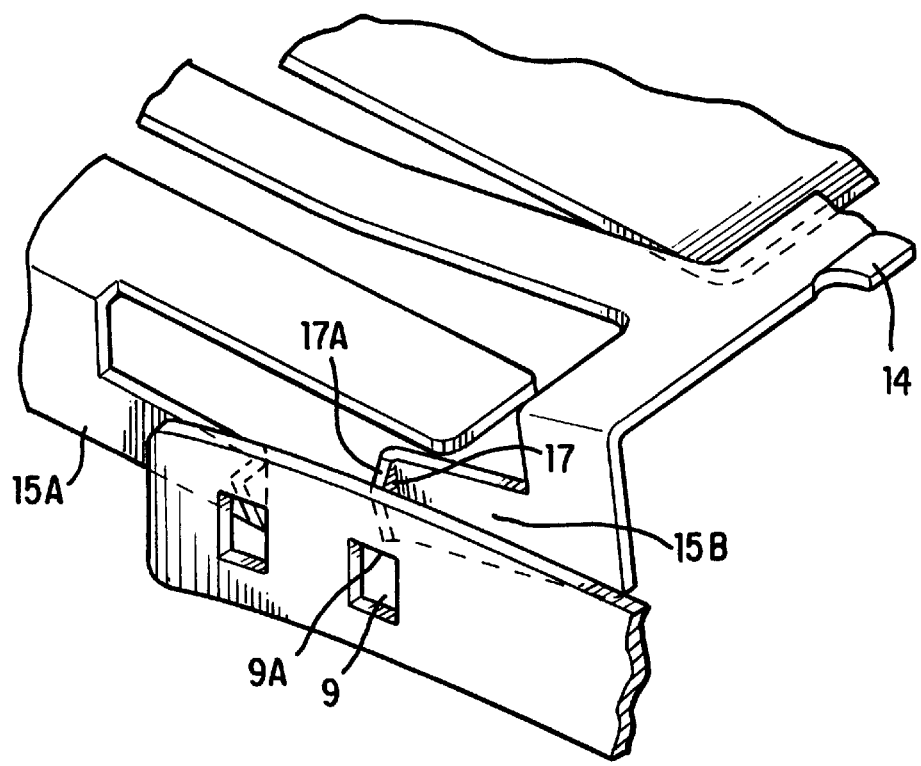
FIG. 5 is a perspective view of the connector with the first and second engaging side walls are unlocked.
Figure 6:
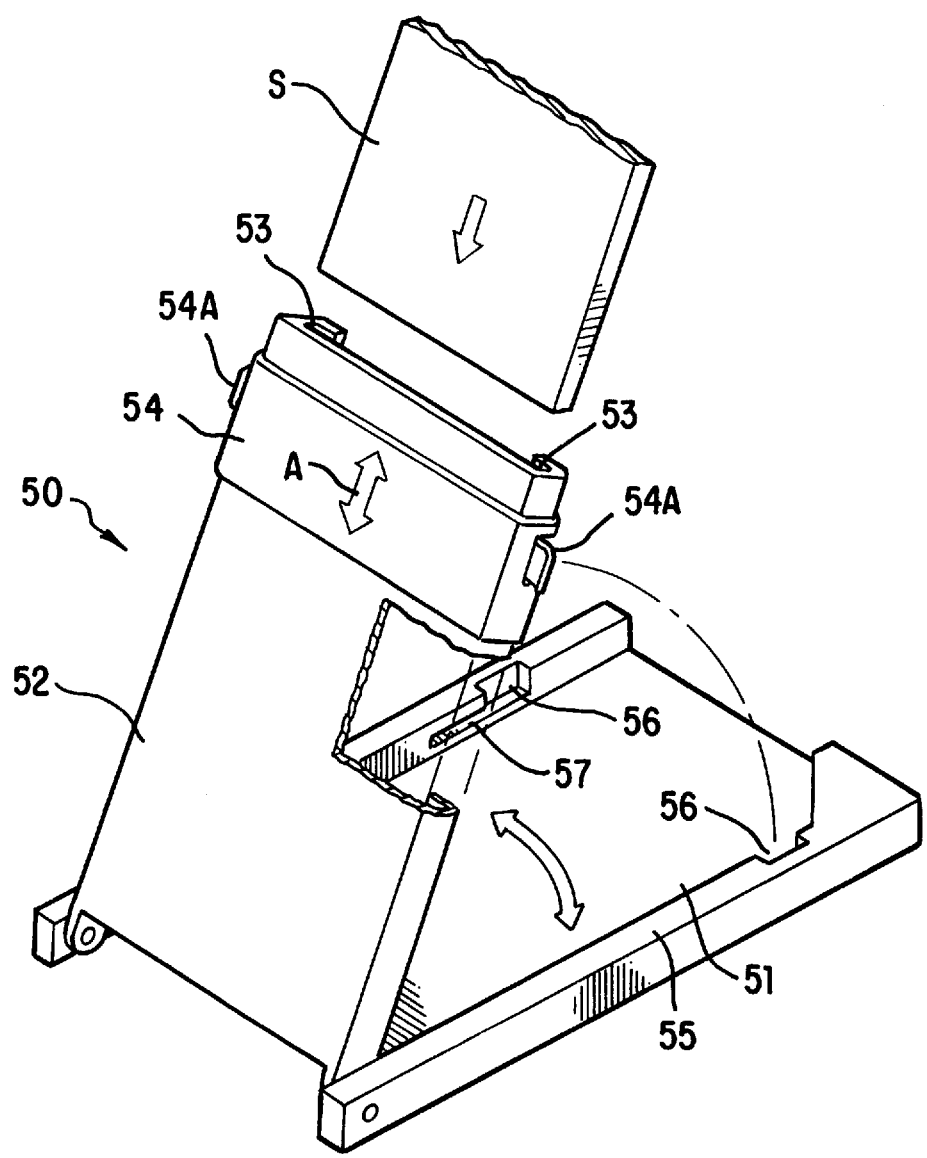
FIG. 6 is a perspective view of a conventional connector with a cover opened.

(3) To open the cover section 3, the cover section 3 is lifted upwardly with the curved tab 14. As shown in FIG. 5, the area between the curved tab 14 and the release arms 15B is flexed upwardly independently of the engaging arms 15A. Since the upper sides 17A are slant, the release pieces 17 slide upwardly over the upper edges 9A of the engaging windows 9 while flexing the first engaging side walls 7 outwardly. When the amounts of flexure in the release arms 15B and the first engaging side walls 7 reach predetermined levels, the engaging projections 16 come off from the engaging windows 10. Thus, the cover section 3 is unlocked from the base section 2 and returned to the open position in FIG. 1 for replacement of the SIM card.

Alternatively, the engaging windows and the engaging and release projections may be provided in the second and first engaging side walls, respectively.

A SIM card may be placed directly on the base section instead of the cover section.

As has been described above, the release projections are provided so that when the cover section is lifted, the release projections provided on a flexible area with respect to the engaging projections release the lock so that not only the operation is simplified but also the close state is locked without failure. The first and second engaging side walls are made flat within the recesses so that the width of the connector is not increased, resulting in the compact connector.

What is claimed is:

1. A surface contact card connector comprising:
    a base section made of an insulating material;
    a cover section attached to said base section at a rear end for rotation between open and close positions;
    a contact element provided on said base section such that a contact portion of said contact element is brought into contact with a surface contact card when said cover section is closed to said base section;
    base and cover engaging side walls provided on opposite sides of both said base and cover sections, respectively, such that when said cover section is closed to said base section, said base and cover engaging side walls are spaced and faced respectively to each other;
    at least said base or cover engaging side walls of said base or cover section being cantilevered arms and flexible;
    engaging windows having through openings provided in said base or cover engaging side walls of said base or cover section;
    engaging and releasing projections provided on said cover or base engaging side walls such that when said cover section is closed to said base section, said engaging and releasing projections flex said cantilevered arms of said base or cover section outwardly and engage with said engaging windows;
    said engaging projections each having a substantially right-angled triangle shape whose upper side is substantially at right angles to said cover engaging side walls and said releasing projections each having a triangular shape and are provided at positions where portions of said cover engaging side walls with said releasing projections are more flexible than portions of said cover engaging side walls with said engaging projections when said cover section is opened from said base section.

2. A surface contact card connector according to claim 1, wherein said releasing projections are provided at positions farther than said engaging projections from said rear end of said base section.

3. A surface contact card connector according to claim 1, wherein said base section further comprises recesses for receiving said engaging side walls to minimize a width of said base section.

4. A surface contact card connector according to claim 1, wherein said releasing projections have a slanted top side to facilitate disengagement from said engaging windows.

* * * * *